Aug. 16, 1949.  W. R. J. WOOCK  2,479,448
FISHING TACKLE RETRIEVER
Filed Oct. 7, 1946
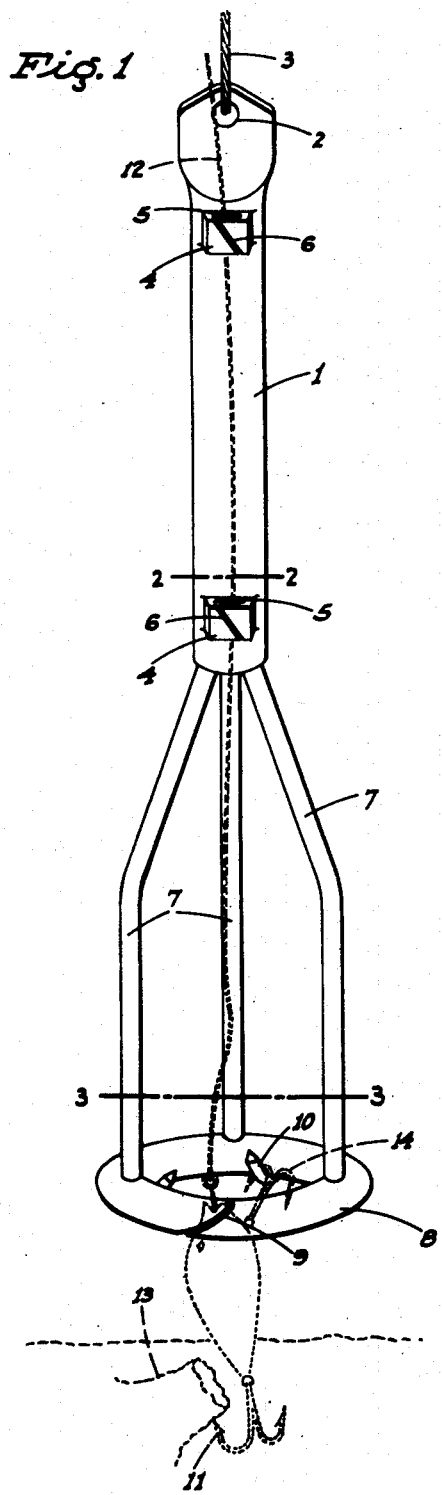
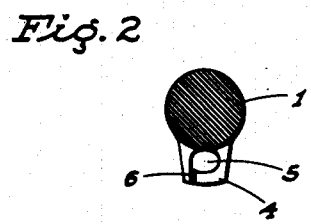
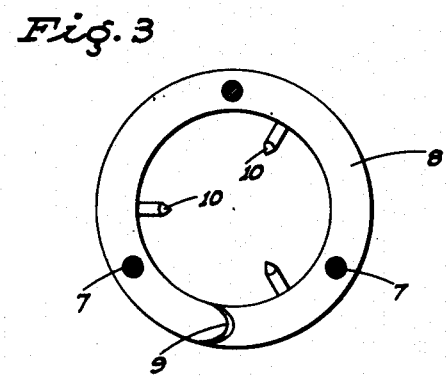
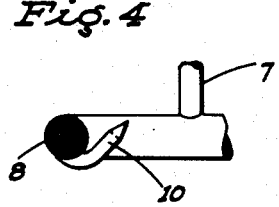
INVENTOR.
W. R. J. Woock
BY
ATTYS Patented Aug. 16, 1949

2,479,448

UNITED STATES PATENT OFFICE 2,479,448

FISHING TACKLE RETRIEVER

Walter R. J. Woock, Lodi, Calif.

Application October 7, 1946, Serial No. 701,756

1 Claim. (Cl. 43—30)

This invention relates to a means for retrieving fish lines, plugs, jiggers, and their hooks, and lures which have been snagged at the bottom of the water.

The object of the invention is to provide a means for effectively dislodging a snagged plug and jigger or the like from the object to which it is snagged, or retrieving the entire hook and line and the object on which it is snagged to prevent loss of any portion of the line, hook, or lure. This equipment is somewhat costly and its recovery intact is therefore quite desirable.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of my improved retriever.

Fig. 2 is a sectional view taken on the line 2—2 of Fig. 1.

Fig. 3 is a sectional view taken on the line 3—3 of Fig. 1.

Fig. 4 is a fragmentary sectional view of a portion of the bottom ring of the retriever.

Referring now more particularly to the characters of reference on the drawings, the numeral 1 designates a substantially solid shank of relatively heavy material, in the top of which is an eye 2 to which is connected a relatively stout cord 3. On the face of the element 1, and in spaced relation along the length thereof, are a pair of projecting lugs 4 which are centrally orificed, as at 5, and leading into which orifices are diagonally disposed slots 6. Projecting downwardly from the bottom of the element 1 are a number of spaced finger bars 7, on the bottom of which is supported a ring 8, such ring having a diagonally disposed threading slot 9 cut through the body thereof.

About the bottom of the ring 8 are a number of spaced hooks 10; said hooks curving inwardly and upwardly toward the longitudinal axis of the ring and about the inner circumferential surface thereof, terminating within the confines of said ring.

When a hook 11 on the plug, jigger or the like at the bottom of the fish line 12 or any part of the lure on the line becomes snagged on an object, as at 13, my retriever is brought into play in the following manner:

The line 12 is threaded through the slots 6 and 9 so that it has a straight line position through the entire retrieving unit. Through the medium of the cord 3 the retriever is then allowed to slide down the fish line 12. When it reaches the bottom of the line adjacent a snag the ring 8 may possibly pass over the snag, and then by a straight pull on the cord 3 the snag, fish hook, and fish line may be brought to the surface of the water; this by reason of the fact that one or more of the hooks will bite into the snag in holding relation. If the snag is too heavy or too large to be brought to the surface the retriever unit may be manipulated until one of the upper hooks 14 on the plug or jigger is engaged by one of the hooks 10. A straight line pull on the cord 3 will then either pull the snagged hook 11 free or bend it straight and thus relieve it from the snag. All of this can be done without injury to the plug or jigger.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

A retriever for the purpose described comprising a shank, means on the shank whereby a fish line may be threaded therethrough to extend along the shank, divergent bars on the shank at one end thereof, and extending substantially longitudinally of the axis of the shank, a relatively heavy ring secured to the lower end of the bars, means whereby a fish line may be threaded into the ring, and a plurality of hooks fixed rigidly to the bottom of the ring and curving inwardly and upwardly toward the longitudinal axis of the ring, and about the inner circumferential surface of such ring, said hooks terminating within the confines of the ring.

WALTER R. J. WOOCK.

REFERENCES CITED

The following references are of record in the file of this patent:

UNITED STATES PATENTS

| Number | Name | Date |
|---|---|---|
| 419,054 | Mayer | Jan. 7, 1890 |
| 1,215,073 | Stevens | Feb. 6, 1917 |
| 1,709,298 | Zoppa | Apr. 16, 1929 |
| 1,958,514 | Hope | May 15, 1934 |
| 1,982,132 | Boles | Nov. 27, 1934 |
| 2,235,371 | Jyrkas | Mar. 18, 1941 |
| 2,316,500 | Bray | Apr. 13, 1943 |

FOREIGN PATENTS

| Number | Country | Date |
|---|---|---|
| 26,120 | Great Britain | 1906 |